(12) United States Patent
Maeda et al.

(10) Patent No.: US 7,140,098 B2
(45) Date of Patent: Nov. 28, 2006

(54) APPARATUS FOR MANUFACTURING ROTARY-ELECTRIC-MACHINE STATOR

(75) Inventors: Kazutaka Maeda, Toyota (JP); Masaru Sugiyama, Okazaki (JP); Makoto Takahashi, Okazaki (JP); Youichi Kamakura, Anjo (JP)

(73) Assignee: Denso Corporation, Kariya (JP)

( * ) Notice: Subject to any disclaimer, the term of this patent is extended or adjusted under 35 U.S.C. 154(b) by 681 days.

(21) Appl. No.: 10/029,255

(22) Filed: Dec. 28, 2001

(65) Prior Publication Data

US 2002/0053126 A1    May 9, 2002

Related U.S. Application Data

(62) Division of application No. 09/394,526, filed on Sep. 10, 1999, now abandoned.

(30) Foreign Application Priority Data

Sep. 11, 1998  (JP) .................. 10-258783

(51) Int. Cl.
*B23P 19/00* (2006.01)
(52) U.S. Cl. .............. 29/732; 29/735; 29/596; 29/455.1; 29/868; 310/42
(58) Field of Classification Search .............. 29/732, 29/709, 733, 735, 596, 597, 598, 737, 455.1, 29/868, 869; 310/42, 195, 198, 201, 254, 310/259
See application file for complete search history.

(56) References Cited

U.S. PATENT DOCUMENTS

| | | | |
|---|---|---|---|
| 1,555,931 A | 10/1925 | Apple | |
| 3,803,951 A | 4/1974 | Bagley | |
| 3,999,093 A | 12/1976 | Kirtley | |
| 4,041,294 A * | 8/1977 | Inoyama et al. | .......... 29/596 X |
| 4,437,230 A | 3/1984 | Greutmann | |
| 5,266,858 A * | 11/1993 | Ohmi et al. | ............ 310/195 X |
| 5,363,546 A | 11/1994 | Bradtmueller et al. | |
| 5,495,131 A | 2/1996 | Goldie et al. | |
| 5,998,903 A | 12/1999 | Umeda et al. | |
| 6,144,136 A | 11/2000 | Umeda et al. | |
| 6,249,956 B1 | 6/2001 | Maeda et al. | |

FOREIGN PATENT DOCUMENTS

| | | | | |
|---|---|---|---|---|
| JP | 58-112446 | * | 7/1983 | .................. 29/732 |
| JP | 59-103546 | | 6/1984 | |
| JP | 60-241748 | | 11/1985 | |
| JP | 62-2836 | * | 1/1987 | .................. 29/732 |
| WO | 92/06527 | | 4/1992 | |
| WO | 98/54823 | | 3/1998 | |

* cited by examiner

*Primary Examiner*—A. Dexter Tugbang
(74) *Attorney, Agent, or Firm*—Oliff & Berridge, PLC

(57) ABSTRACT

An apparatus for shaping coil ends of a generator's stator having a plurality of sets of U-shaped large and small conductor segments. The apparatus includes four twister cylinders holding connection ends of the large and small conductor segments in four radial layers at an axial end of the stator, a rotating mechanism rotating the twister cylinders alternately in opposite directions, an elevating mechanism moving the twister cylinders in the axial direction of the stator, and a controller synchronously controlling the rotating mechanism and elevating mechanism.

14 Claims, 4 Drawing Sheets

APPARATUS FOR MANUFACTURING ROTARY-ELECTRIC-MACHINE STATOR

This is a Divisional of U.S. patent application No. 09/394,526 filed Sep. 10, 1999, now abandoned.

CROSS REFERENCE TO RELATED APPLICATION

The present application is based on and claims priority from Japanese Patent Application Hei 10-258783, filed Sep. 11, 1999, the contents of which are incorporated herein by reference.

BACKGROUND OF THE INVENTION

1. Field of the Invention

The present invention relates to an apparatus and a method for manufacturing a stator of a rotary electric machine and, particularly, a method and an apparatus for shaping conductor members of a stator of an AC generator for a vehicle.

2. Description of the Related Art

Recently, an AC generator's stator for a vehicle is equipped with a plurality of U-shaped conductor segments to satisfy the demand for increase in power supply.

PCT application 92/06527 discloses a method of manufacturing such a stator. Conductor members in radially outside and inside layers of the slots of a generator's stator are bent by a bending tool in circumferential directions first and, subsequently, bent in radial directions to connect each of the conductor members in the outside layer to one of the inside layer. Because the conductor members are not held by the tool after the bending rotation, the coil-ends of the stator winding can not be formed as compact as possible.

Although JP-A-60-241748 discloses an apparatus which bends the conductor members in both circumferential and radial directions. However, this apparatus has a projection member for forming electrical insulation spaces between the conductor members, and this may cause damage to the surface of the conductor members.

SUMMARY OF THE INVENTION

A main object of the invention is to provide an improved apparatus for shaping the conductor members of a rotary-electric-machine stator.

Another object of the invention is to provide a new apparatus of shaping the conductor members without causing damage to the conductor members.

Another object of the invention is to provide a new apparatus of shaping the conductor members that is applicable various types of the stator.

According to a preferred embodiment of the invention an apparatus for shaping a plurality of conductor members of a rotary-electric-machine stator including first means for holding the conductor members, second means for moving the first means in the circumferential direction of the stator, and third means for moving the first means in the axial direction of the stator. The first means preferably includes a pair of twister cylinders coaxially disposed with each other. Each of the pair of twister cylinders rotates in a direction opposite to each other. Each of the pair of twister cylinders has a plurality of holes disposed circumferentially at equal intervals, and the plurality of holes of one of the twister cylinder is radially spaced apart from the plurality of holes of the other at a first distance.

Another object of the invention is to provide an improved method for shaping the conductor members of a rotary-electric-machine stator.

According to a preferred embodiment of the invention, a method for manufacturing a rotary-electric-machine-stator including steps of inserting a plurality of a set of U-shaped large and small conductor segments into stator's slots in four radial layers, holding each end of the conductor segments in four circumferential layers, circumferentially and radially moving each end of the conductor segments so that the length of the conductor segments extending from the stator can be maintained constant to position each pair of ends of the large and small conductor segments in outer two of the circumferential layers side by side and each pair of ends of the large and small conductor segments in inner two of the circumferential layers side by side, and welding each end of the conductor members positioned side by side.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

Figure 1:
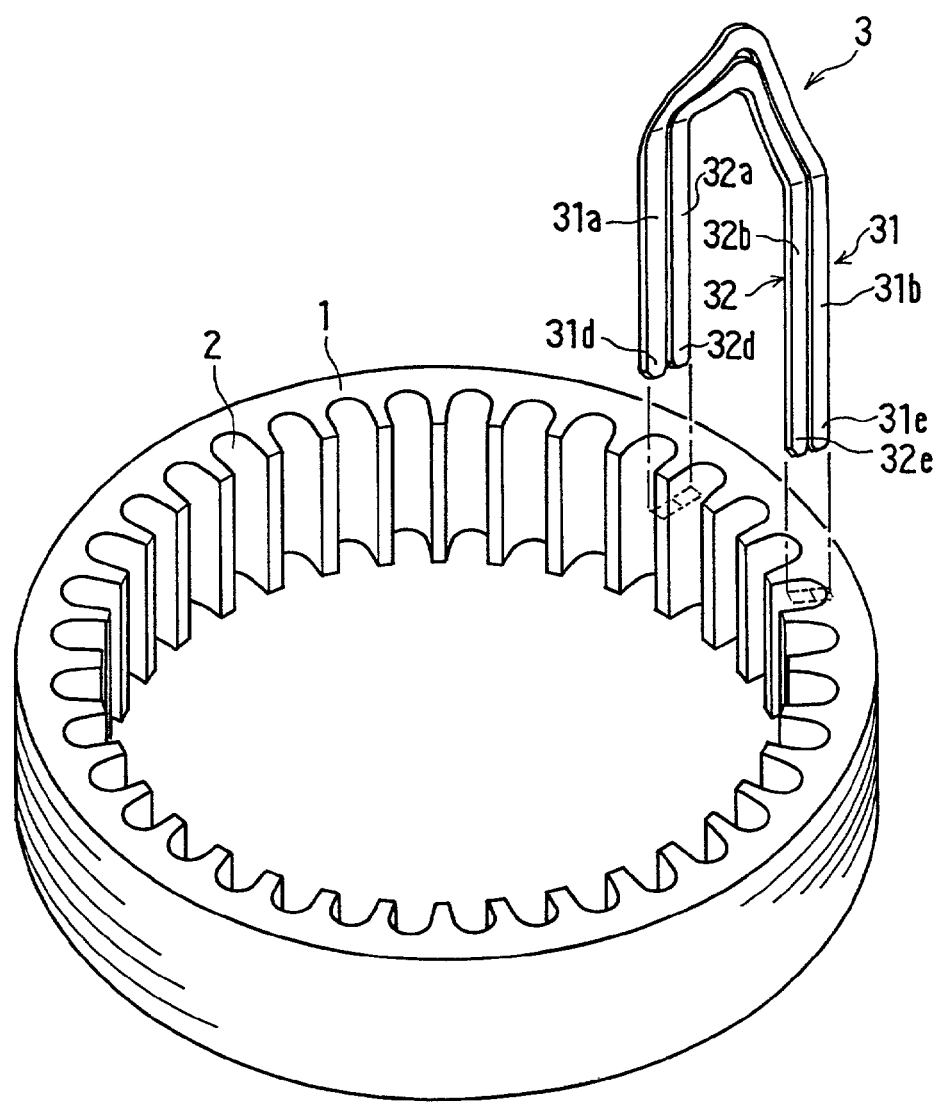
FIG. 1 is a perspective view illustrating a stator core and a set of conductor segments to be inserted into a pair of slots.

As shown in FIG. 1, stator core 1 has thirty six slots 2, and a set 3 of U-shaped large and small conductor segments 31 and 32 is inserted into each pair of the slots 2 spaced apart from each other by one pole-pitch (or three slots in this case) to form a three-phase stator winding.

Figure 2:
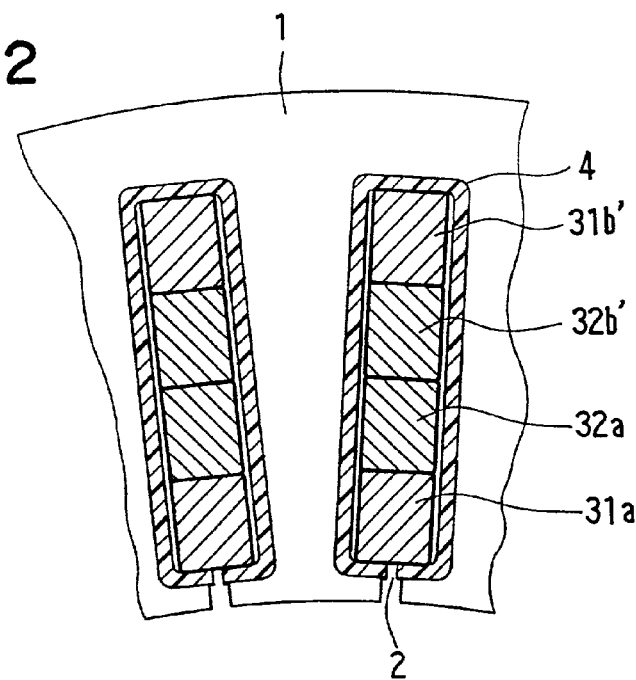
FIG. 2 is a fragmentary cross-sectional view of the stator core having conductor members disposed in the slots thereof.

As shown in FIG. 2, in-slot portions 31a, 32a of one set 3 are inserted into two inside layers of a slot 2, and in-slot portions 32a', 31a' of another set 3 are inserted into two outside layers of the same slot. Insulation film 4 surrounds all in-slot portions 31a, 32a, 32b', 31b' in four layers to insulate the same from stator core 1.

Figure 3:
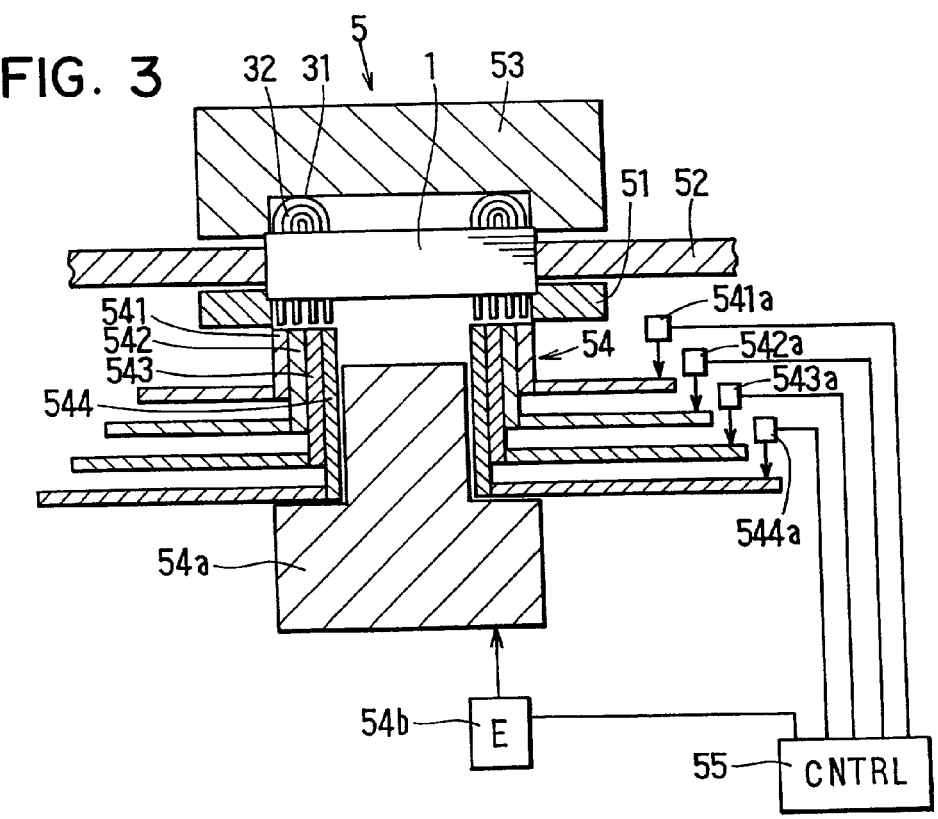
FIG. 3 is a schematic diagram illustrating a shaping apparatus according to a preferred embodiment of the invention.

After all sets 3 of segments 31, 32 are inserted into thirty six slots of stator core 1, the straight portions of segments 31, 32 extending from stator core 1 are shaped by shaping apparatus 5 shown in FIG. 3. Shaping apparatus includes work support 51, holder 52, presser 53, shaping unit 54, elevating shaft 54a, elevating mechanism 54b, rotating mechanisms 541a, 542a, 543a, 544a, and controller 54b.

Work support 51 supports the peripheral corner of stator core 1, holder 52 holds the outer periphery of stator core 1, presser 53 presses and hold down stator core 1, twisting unit 54 holds connection ends 31d, 31e, 32d, 32e of large and small segments 31, 32, elevating shaft 54a and elevating mechanism 54b move twisting unit 54 up or down, rotating mechanisms 541a–544a rotate twisting unit 54, and controller 54b controls elevating mechanism 54b and rotating mechanisms 541a–544a.

Twisting unit 54 is composed of four twister cylinders 541, 542, 543 and 544 coaxially disposed to be telescopically coupled with each other, so that each twister cylinder can rotate separately about the same axis. Each twister cylinder has an annular flange engaged with one of rotating mechanisms 541a–544a. Upper ends of twister cylinders 541–544 are leveled with one another, and respectively have a plurality of circumferentially equal-spaced catch holes 541b, 542b, 543b 544b, which are respectively located to correspond to connection ends 31e, 32e, 32d and 31d.

Outer connection ends 31e of large segments 31 extending from the outermost layer of slots 2 are inserted into catch holes 541b of twister cylinder 541, outer connection ends 32e of the small segments 32 extending from the layer adjacent to the outermost layer are inserted into catch holes 542b of twister cylinder 542, inner connection end 32d of small segments 32 extending from the layer adjacent to the innermost layer are inserted into catch holes 543b of twister cylinder 543, and inner connection end 31d of large segments 31 extending from the innermost layer are inserted into catch holes 544b of twister cylinder 544.

Figure 4:
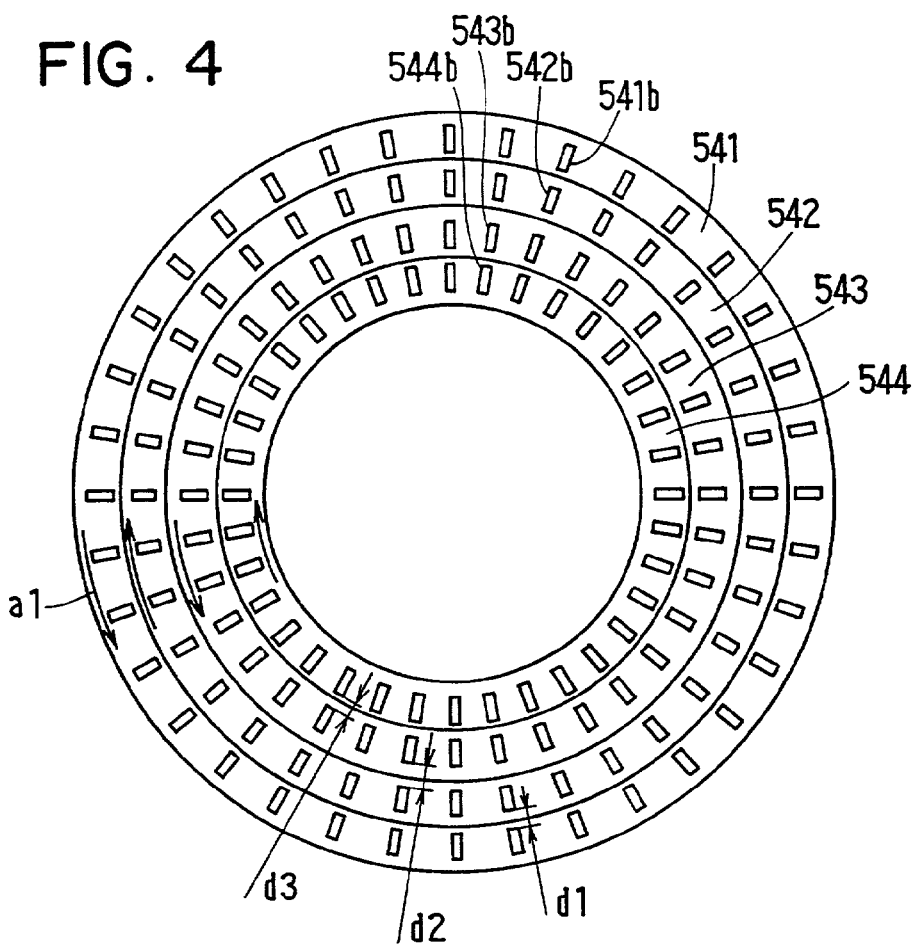
FIG. 4 is a schematic diagram illustrating a set of twister cylinders of the shaping apparatus illustrated in FIG. 4.
Figure 7:
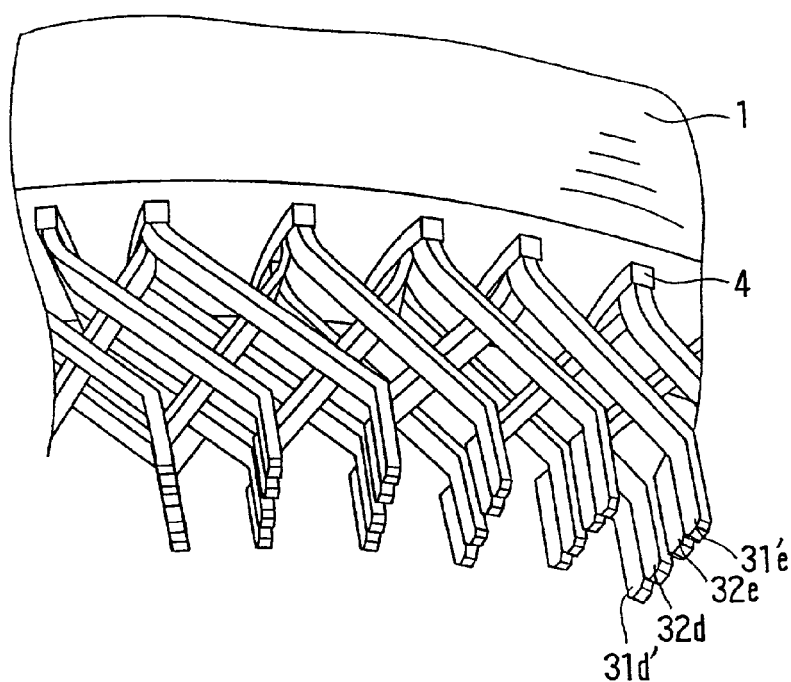
FIG. 7 is a fragmentary perspective view of coil-ends of the stator.

As shown in FIGS. 4 and 7, each of catch holes 542b of twister cylinder 542 adjacent to outermost twister cylinder 541 is radially spaced apart from any of catch holes 541b at a distance d1 which is suitable to weld the adjacent connection ends 31e' and 32e, each of catch holes 543b of twister cylinder 543 adjacent to twister cylinder 542 is radially spaced apart from any of catch holes 542b at a distance d2 which is suitable to insulate the adjacent connection ends 32e and 32d, each of catch holes 544b of innermost twister cylinder 544 adjacent to twister cylinder 543 is radially spaced apart from any of catch holes 543b at a distance d3 which is suitable to weld the adjacent connection ends 32d and 31d', and, naturally, distance d2 is larger than distance d1 or distance d3.

Stator core 1 with all the segments inserted into the slots is placed on support 51 and held tightly by holder 52. Then, stator core 1 is pressed by presser 53 on the upper peripheral corner thereof and the top of turn portions 31c of large segments 31.

Subsequently, elevating shaft 54a elevates twisting unit 54 to a suitable position to insert the chamfered connection ends 31d, 31e, 32d, or 32e into the catch holes as described above.

Figure 5:
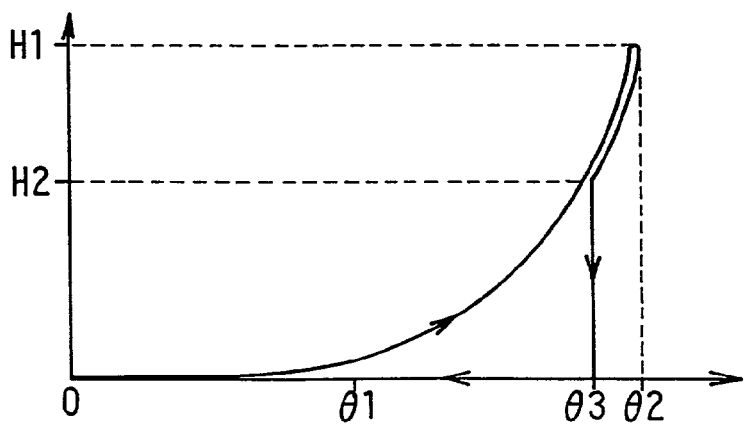
FIG. 5 is a graph showing motion of the twister cylinder.

Then, elevating shaft 54a is controlled by controller 55 to moved up and down in synchronism with rotation of the twister cylinders as illustrated in FIG. 5, so that the length of the conductor members extending from the slots can be maintained constant. Twister cylinder 541 that holds connection ends 31e extending from the outermost layer and twister cylinder 543 that holds connection end 32d extending from the layer next to the innermost layer rotate counterclockwise as indicated by an arrow al in FIG. 4. At the same time, twister cylinder 542 that holds connection ends 32e extending from the layer next the outermost layer and twister cylinder 544 that holds connection end 31d extending from the innermost layer rotate clockwise in FIG. 4.

As shown in FIG. 5, while each twister cylinder rotates within an angle θ1, elevation shaft 54a and each twister cylinder does not move up significantly. Elevation shaft 54a moves up to a position of height H2 that corresponds to the height of the coil ends when each twister cylinder rotates by angle θ3 that corresponds to a half pole-pitch position and to a top position of height H1 that is higher the position H2 when each twister cylinder rotates farther to a position of an angle θ2. Each twister cylinder returns from the position of angle θ2 to the position of angle θ3 after each twister cylinder is elevated to the top position Hi to take out connection ends 31d, 31e, 32d, 32e from twister cylinders 541–544. This step prevents spring back of the bent portions of the segments and moves each of connection ends 31d, 31e, 32d, 32e along a circular locus, thereby providing a stator winding with small coil ends. Although the twister cylinders are elevated beyond the height of the coil ends, the segments do not fall out from the stator core because they are elevated after they are bent to cling onto the stator core.

Figure 6:
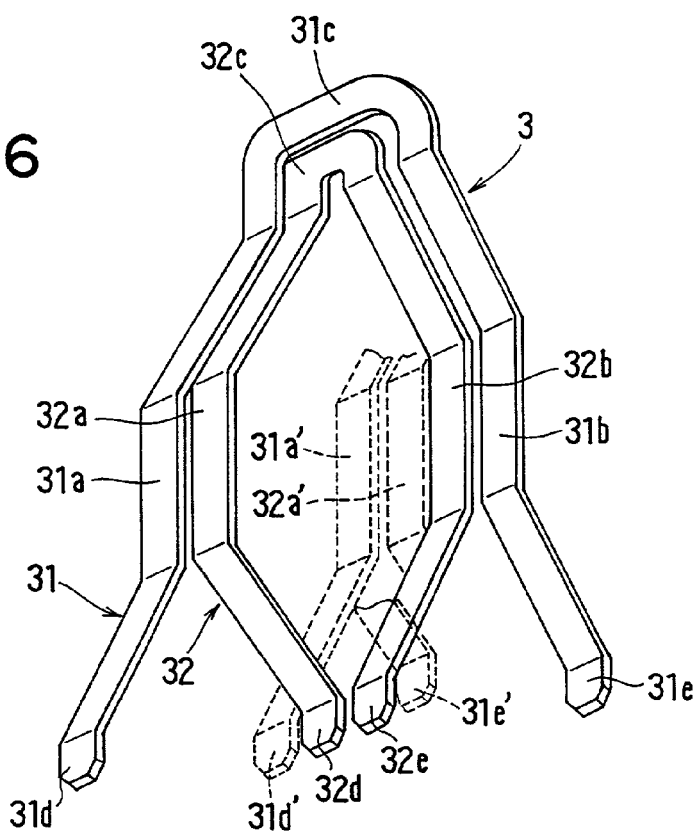
FIG. 6 is a perspective view of a set of conductor segments after being shaped.

Thus, each set 3 of large and small segments 31 and 32 is formed as shown in FIG. 6: large segment 31 has in-slot portion 31a, turn portion 31c, and chamfered connection ends 31d, 31e formed at the opposite ends thereof; small segment 31 also has in-slot portion 32a, turn portion 32c, and chamfered connection ends 32d, 32e formed at the opposite ends thereof; turn portion 32c of small segment 32 is surrounded by turn portion 31c of large segment 31.

Thereafter, twisting unit 54 is returned to the original position, and holder 52 is removed to unload the stator core with the shaped segments as shown FIG. 7 is unloaded from the shaping apparatus.

Accordingly, no projection member forming electrical insulation spaces stated before, which otherwise, causes damage to the surface of the conductor members is necessary.

The shaping apparatus can be applied to various types of stators only by changing the twister cylinders.

Subsequently, connection ends 31d, 31e, 32d, 32e adjacent to each other are welded to form the three-phase stator winding.

In the foregoing description of the present invention, the invention has been disclosed with reference to specific embodiments thereof. It will, however, be evident that various modifications and changes may be made to the specific embodiments of the present invention without departing from the broader spirit and scope of the invention as set forth in the appended claims. Accordingly, the description of the present invention in this document is to be regarded in an illustrative, rather than restrictive, sense.

What is claimed is:

1. An apparatus for shaping a plurality of conductor members disposed circumferentially and extending axially from a rotary-electric-machine stator comprising:

first means for holding said conductor members;

second means for moving said first means in the circumferential direction of said stator; and third means for moving said first means in the axial direction of said stator; wherein said first means comprises a first pair of twister cylinders coaxially disposed with each other and a second pair of twister cylinders coaxially disposed adjacent to said first pair of twister cylinders;

each of said first pair of twister cylinders has a plurality of holes disposed circumferentially at equal intervals, and said plurality of holes of one of said twister cylinders of said first pair is radially spaced apart from said plurality of holes of the other of said twister cylinders of said first pair at a first distance;

said first and second pairs of twister cylinders are disposed at a second distance from each other; and each of said second pair of twister cylinders has a plurality of holes disposed circumferentially at equal intervals, and said plurality of holes of one of said twister cylinders of said second pair is radially spaced apart from said plurality of holes of the other of said twister cylinders of said second pair at a third distance.

2. The apparatus as claimed in claim 1, wherein each of said first pair of twister cylinders rotates in a direction opposite to the other.

3. The apparatus as claimed in claim 1, further comprising a controller for simultaneously controlling said second means and said third means.

4. The apparatus as claimed in claim 3, wherein said controller controls said second means to rotate one of said first pair of twister cylinders in a direction opposite to the other.

5. An apparatus for shaping coil ends composed of a plurality of sets of U-shaped large and small conductor segments disposed in four radial-layers of slots of a rotary-machine-stator, said apparatus comprising:

four twister cylinders, respectively rotatable about an axis, for holding connection ends of said large and small conductor segments in said four radial-layers at an axial end of said stator;

a rotating mechanism for rotating said twister cylinders alternately in opposite directions to bend connection ends of said large and small conductor segments in one of said circumferential layers in one direction and connection ends of said large and small conductor segments in an adjacent circumferential layer in the opposite direction;

an elevating mechanism for moving said twister cylinders in the axial direction of said stator; and a controller for controlling said rotating mechanism and said elevating mechanism to move said twister cylinders so that the length of said conductor members extending from said stator can be maintained constant.

6. The apparatus as claimed in claim 5, wherein each of said twister cylinders has a plurality of holes disposed circumferentially at equal intervals.

7. The apparatus as claimed in claim 6, wherein said four twister cylinders are divided into an outer pair of cylinders and an inner pair of cylinders to position each pair of said large and small conductor members in an outer two of said circumferential layers and each pair of said large and small conductor members in an inner two of said circumferential layers side by side respectively.

8. An apparatus for shaping coil ends composed of a plurality of conductor segments disposed in a plurality of radial-layers of slots of a rotary-machine-stator, said apparatus comprising:

a plurality of pairs of twister cylinders respectively corresponding to said radial-layers of slots and rotatable about an axis, said twister cylinders respectively holding connection ends of said conductor segments in separate circumferential layers at an axial end of said stator;

a rotating mechanism for rotating said twister cylinders alternately in opposite directions to bend connection ends of said conductor segments in one of said circumferential layers in one direction and connection ends of said conductor segments in an adjacent circumferential layer in the opposite direction;

an elevating mechanism for moving said twister cylinders in the axial direction of said stator; and a controller for controlling said rotating mechanism and said elevating mechanism to move said twister cylinders so that the length of said conductor members extending from said stator can be maintained constant.

9. An apparatus for shaping a plurality of conductor members disposed circumferentially and extending axially from a rotary-electric machine stator so that connection ends of the conductor members are disposed at one end of the stator, said apparatus comprising:

first means for holding said conductor members at the connection ends of the conductor members;

second means for moving said first means in a circumferential direction of said stator; and third means for moving said first means in the axial direction of said stator, wherein said second means and said third means are arranged to move said first means in a controlled manner.

10. The apparatus as claimed in claim 9, wherein said first means comprises a first pair of twister cylinders coaxially disposed with each other.

11. The apparatus as claimed in claim 10, wherein each of said first pair of twister cylinders rotates in a direction opposite to the other.

12. The apparatus as claimed in claim 10, wherein each of said first pair of twister cylinders has a plurality of holes disposed circumferentially at equal intervals, and said plurality of holes of one of said twister cylinders of said first pair is radially spaced apart from said plurality of holes of the other of said twister cylinders of said first pair at a first distance.

13. The apparatus as claimed in claim 12, further comprising a second pair of twister cylinders coaxially disposed adjacent to said first pair of twister cylinders at a second distance, and each of said second pair of twister cylinders has a plurality of holes disposed circumferentially at equal intervals, and said plurality of holes of one of said twister cylinders of said second pair is radially spaced apart from said plurality of holes of the other of said twister cylinders of said second pair at a third distance.

14. The apparatus as claimed in claim 9, further comprising a controller for simultaneously controlling said second means and said third means.

* * * * *